United States Patent [19]

Walton et al.

[11] Patent Number: 5,035,408
[45] Date of Patent: Jul. 30, 1991

[54] JOUNCE RESPONSIVE ACTUATOR FOR PARALLEL AUXILIARY SPRING

[75] Inventors: Erlen B. Walton, Farmington Hills; David M. Preston, Drayton Plains; James L. Oliver, Pontiac; James A. Juriga, Bloomfield Hills, all of Mich.

[73] Assignee: Eaton Corporation, Cleveland, Ohio

[21] Appl. No.: 457,026

[22] Filed: Dec. 26, 1989

[51] Int. Cl.5 .............................................. B60G 11/10
[52] U.S. Cl. ...................................... 267/265; 267/260
[58] Field of Search ...................... 267/40, 41, 42, 43, 267/44, 45, 51, 241, 260, 261, 265

[56] References Cited

U.S. PATENT DOCUMENTS 1,114,857 10/1914 Campodonico ...................... 267/241
1,362,037 12/1920 Peterson ................................ 267/45
2,304,780 12/1942 de Fries ................................ 267/45
2,825,578 3/1958 Walker ............................. 267/45 X
3,430,976 3/1969 Vautier ................................ 280/124
3,484,091 12/1969 Draves .
3,869,140 3/1975 Allison ........................... 280/124 R Primary Examiner—Robert J. Oberleitner
Assistant Examiner—Alfred Muratori
Attorney, Agent, or Firm—P. S. Rulon

[57] ABSTRACT

Selectively engagable auxiliary leaf spings (38 or 138) for vertically supporting a vehicle chassis (32) on an axle assembly (22 or 102) in parallel with main suspension springs (34 or 114). In three of the disclosed embodiments, both ends (38b,38a) of the auxiliary springs (38) are pivotally attached. In two other embodiments, one end (138a) of each auxiliary leaf spring (138) is pivotally attached and the other end (138b) is rigidly affixed in cantilever fashion. Actuators (140 or 170) are employed to selectively enable or increase load supporting of the auxiliary leaf springs.

16 Claims, 3 Drawing Sheets

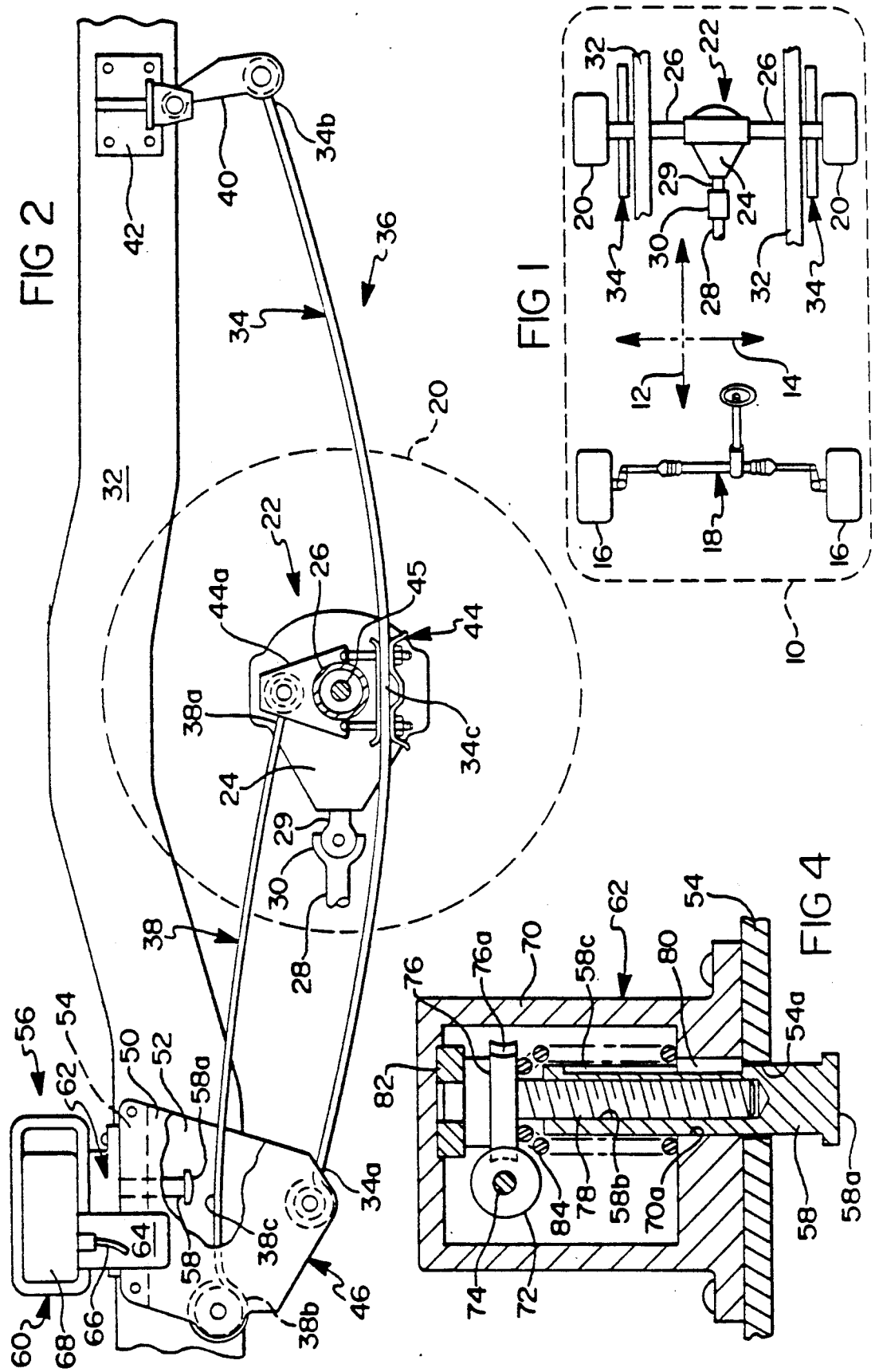

JOUNCE RESPONSIVE ACTUATOR FOR PARALLEL AUXILIARY SPRING

CROSS-REFERENCE TO RELATED APPLICATION

This application is related to U.S. application Ser. Nos. 07/456,872; 07/456,914; now abandoned U.S. Ser. No. 07/457,025; now U.S. Pat. No. 4,982,972 U.S. Ser. Nos. 07/457,065; 07/457,068; 07/457,069; all filed the same date as this application; and all assigned to the assignee of this application.

FIELD OF THE INVENTION

This invention relates to auxiliary or helper springs for vehicle suspension systems. More particularly, this invention relates to selectively engagable auxiliary leaf springs.

BACKGROUND OF THE INVENTION

Selectively engagable auxiliary leaf springs are known in the prior art as may be seen by reference to Draves U.S. Pat. No. 3,484,091, and incorporated herein by reference. The Draves patent discloses left and right ground engaging wheels rotatably mounted on opposite ends of an axle assembly extending transverse to a longitudinal axis of a vehicle chassis, left and right main suspension springs of the leaf or coil type vertically supporting the chassis on the axle assembly, left and right generally longitudinally extending auxiliary leaf springs each having an end pivotally affixed to the chassis and a unaffixed or free end, and an actuator assembly selectively operative to move the free end into load supporting engagement with the axle assembly. Such an auxiliary spring arrangement allows the main suspension springs to be designed for ride comfort when the vehicle is unloaded or lightly loaded, and is particularly well suited for light duty utility vehicles such as pick-up trucks which are used more for commuting than load hauling. However, since the auxiliary leaf springs of Draves have an unattached or free end they can only function to help support load, also the free ends of the auxiliary springs can clash against the axle and produce annoying noise.

SUMMARY OF THE INVENTION

An object of the present invention is to provide an improved auxiliary leaf spring arrangement for a vehicle.

A further object of the present invention is to provide an auxiliary leaf spring which can function as traction link, which can mitigate distortion of main leaf springs due to drive and/or braking torque, and which, when used with a drive axle having an unsprung differential, can readily control the drive angle between the vehicle drive shaft and the differential pinion shaft.

According to a feature of the invention, a vehicle comprises left and right ground engaging wheel mechanisms rotatably mounted on opposite ends of an axle assembly extending transverse to a longitudinal axis of a vehicle chassis assembly; main suspension springs vertically supporting the chassis on the axle assembly; first and second transversely spaced apart and generally longitudinally extending auxiliary leaf springs each having a first end attached to one of the assemblies and a second end disposed for reacting against the other assembly, the auxiliary leaf spring for vertically supporting the chassis on the axle assembly in parallel with the main spring means; and an actuator means affixed to one of the assemblies and selectively operative to position a reaction means between one assembly and a portion intermediate the ends of each auxiliary leaf spring for varying the amount of vertical support provided by the auxiliary leaf springs.

The invention is characterized by each reaction means being movably interposed between the auxiliary leaf spring portion and one end of a movable piston disposed in a housing affixed to one of the assemblies, the other end of the piston and the housing defining a fluid chamber selectively pressurized by a fluid to inhibit movement of the auxiliary leaf spring portion relative to the one assembly and selectively depressurized to allow such movement.

BRIEF DESCRIPTION OF THE DRAWINGS

A vehicle suspension system employing the auxiliary leaf springs according to the invention is shown in the accompanying drawings in which:

FIG. 1 is a schematic plan view of a vehicle;

FIG. 2 is a side elevational view of the left rear portion of a suspension system having an auxiliary leaf spring pivotally attached at both ends;

FIG. 4 is an elevational-sectional view of an actuator speed reducer for engaging and disengaging the auxiliary leaf spring of FIGS. 2 and 3;

DETAILED DESCRIPTION OF THE DRAWINGS

Figure 3:
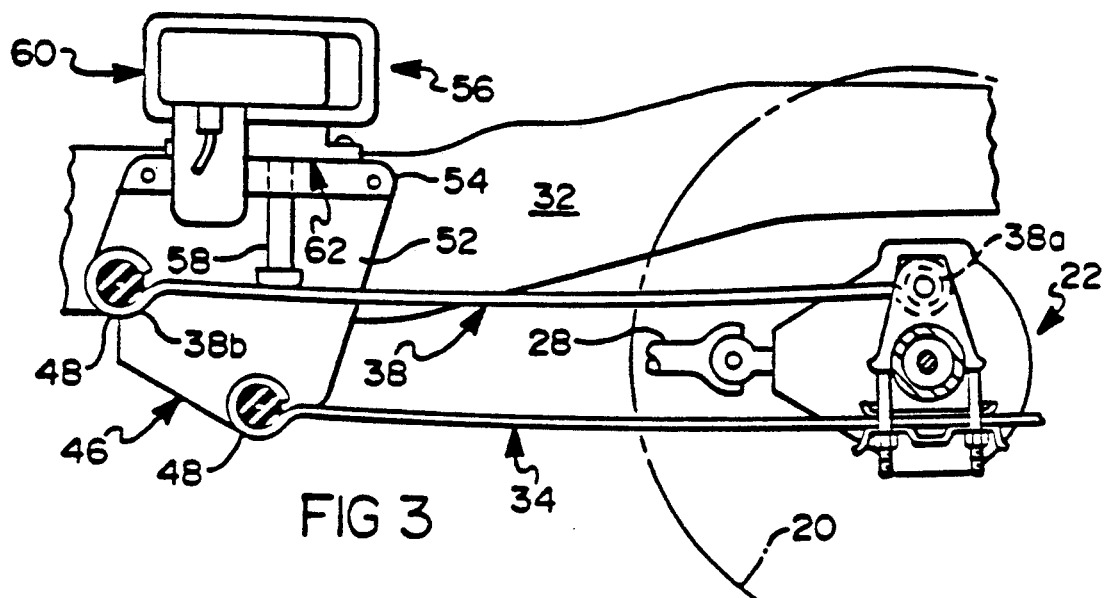
FIG. 3 is a partial view of FIG. 2 with a spring attachment plate removed to illustrate forward mounting of the main and auxiliary leaf spring ends.

The schematic view of FIG. 1 illustrates a wheeled vehicle having a body represented by phantom line 10, longitudinal and transverse axes 12,14, left and right front wheels 16, a steering assembly 18, for the front wheels, left and right rear wheels 20 rotatably supported on opposite ends of a rigid and transversely extending drive axle assembly 22, having a differential gear assembly disposed in a differential housing 24 rigidly affixed to transversely extending tube portions 26, an engine driven drive shaft 28 connected to the differential gear assembly pinion shaft 29 by a flexible joint such as a universal joint 30 shown in FIG. 2, partially shown chassis rails 32, and first and second longitudinally extending main leaf springs 34 each having opposite ends 34a,34b in load supporting relation (see FIG. 2) with the chassis rails and each having an intermediate portion 34c affixed to the axle assembly. For purposes of the present invention, the axle assembly 22 may be a rigid drive or non-drive axle, may support the chassis on other than leaf springs 32 (e.g., coil springs), may be other than rigid (e.g., an axle assembly for independent wheel suspension), or may be other than a rear axle.

Looking now at FIGS. 2 and 3, therein is shown a suspension embodiment 36 of the present invention for the left side of axle assembly 22. The right side is the same and is not shown for brevity. Embodiment 36 includes a known, underslung main leaf spring suspension modified to include an auxiliary or helper leaf spring 38 which is selectively engagable to vertically support the vehicle chassis in parallel with main leaf spring 34, which functions as a traction or drag link, which mitigates distortion of main leaf spring due to drive and braking torque, and which readily controls angular changes in the drive angle between drive and pinion shafts 28,29 due to distortion of main leaf spring 34 and variations in the relative vertical positions of the chassis and axle assembly.

The rear end 34b of spring 34 is pivotally attached to chassis rail 32 in known manner by a shackle and bracket 40,42. A bracket assembly 44 rigidly affixes intermediate portion 34c to the underside of axle tube 26 at a position radially spaced from the rotational and transversely extending axis of a stub shaft 45 drivingly interconnecting wheel 20 and the differential. Bracket assembly 44 includes a pair of upwardly extending and transversely spaced apart flanges 44a (only one shown) for pivotally affixing an end 38a of auxiliary leaf spring 38 to the axle assembly at a position diametrically opposite spring portion 34c. The front or forward ends 34a and 38b of the main and auxiliary leaf springs are pivotally attached to a bracket assembly 46 rigidly affixed to chassis rail 32. The pivotal attachments of the main and auxiliary spring ends may include elastomeric bushings 48 in known manner as shown in FIG. 3.

Bracket assembly 46 includes transversely spaced apart side plates 50,52 and an upper plate 54 rigidly affixed to and spacing the side plates apart. Side plate 50 is partially broken away in FIG. 2 to show side plate 52 and is cut away in FIG. 3. Upper bracket plate 54 provides a mounting surface for an actuator assembly 56 selectively operative to move a surface 58a of a reaction member 58 into and out of engagement with an upper surface portion 38c of auxiliary leaf spring 38. When surfaces 58a,38c are spaced apart, as shown in FIG. 2, auxiliary leaf spring end 38b is free to pivot and main leaf spring 38 provides sole load support for the chassis. When the surfaces are engaged, as shown in FIG. 3, pivotal movement of end 38b is prevented or inhibited and the auxiliary spring shares load support of the chassis in parallel with main leaf spring 34.

Since auxiliary leaf spring 38 is pivotally affixed at its ends 38b,38a to the chassis and the axle assembly and since the auxiliary spring between end 38b,38a is generally in spaced parallel relation to the portion of main leaf spring 34 between end 34a and intermediate portion 34c, it also functions as a drag or traction link which mitigates distortion of main leaf spring 34 due to drive and/or braking torque and which readily controls angular changes in drive angle between drive and pinion shafts 28,29 due to main leaf spring distortion and variation in the relative vertical positions of the chassis and axle assembly. Such drive angle changes are readily controlled by varying the length of the auxiliary leaf, e.g., shortening auxiliary leaf spring 38 in embodiment 36, will provide a nose down attitude of pinion shaft 29 as the vertical distance between chassis and axle assembly decreases due to increased load on the chassis or jounce of the axle assembly. Main leaf spring 34 may be of the single or multiple leaf type. Since auxiliary leaf spring 38 is attached at both ends, it also is effective to maintain the axle assembly in position should the main leaf spring break.

Actuator assembly 56 includes first and second speed reducer assemblies 60,62 drivingly connected in series. Assembly 60 includes an electric motor 64 connectable to a source of electrical power by a wire 66, and an unshown speed reducer contained in a housing 68 and driven by the motor. Assembly 62, which is shown in vertical section in FIG. 4, includes a housing 70 rigidly affixed to upper plate 54, a worm 72 mounted for rotation in the housing about the axis of a shaft 74 driven by motor 64. The worm includes unshown teeth in mesh with partially shown teeth 76a of a worm gear 76 which is affixed to a screw 78 threadably received in a bore 58b of reaction member 58. Reaction member 58 slidably extends through a bore 70a in housing 70 and through an opening 54a in upper plate 54. A seal or boot may be provided to exclude ingress of foreign matter along the interface of member 58 and bore 70a. Rotation of the reaction member is prevented by an elongated keyway 58c slidably received by a key 80 affixed to housing 70. The threaded relation between screw 78 and bore 58b provide a mechanism for linearly moving into engagement with auxiliary spring portion 38c in response to rotation of gears 72,76. Upward thrust acting on reaction member 58, screw 78 and worm gear 76 is reacted by housing 62 through a thrust bearing 82, and these components are biased upward by a spring 84. Actuator assembly 56 may be any of several well known speed reducer assemblies capable of engaging reaction member 58 and sized for engaging the reaction member only prior to chassis loading requiring the auxiliary springs or capable (as herein) of engaging and varying the position of the reaction member under load. Assembly 60 is obtainable through the Eaton Corporation Truck Components Division in Galesburg, Mich., U.S.A. under part number 113700.

Figure 5:
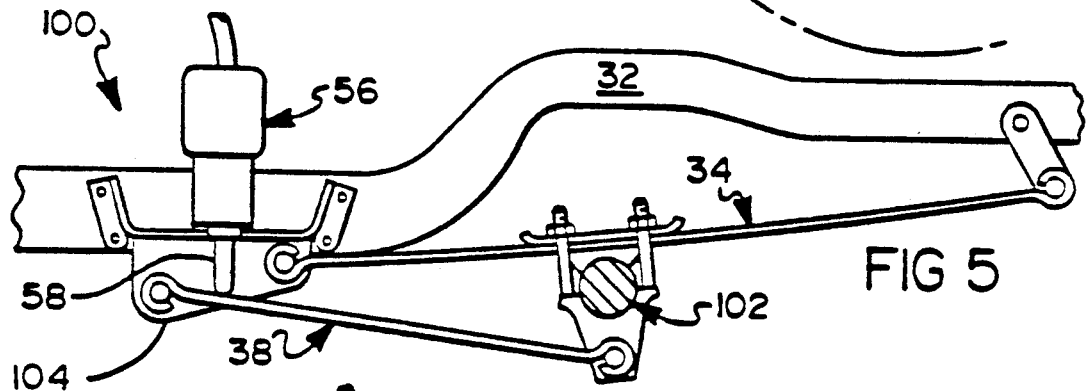
FIGS. 5 and 6 illustrate the auxiliary leaf springs employed with somewhat different suspension systems.
Figure 6:
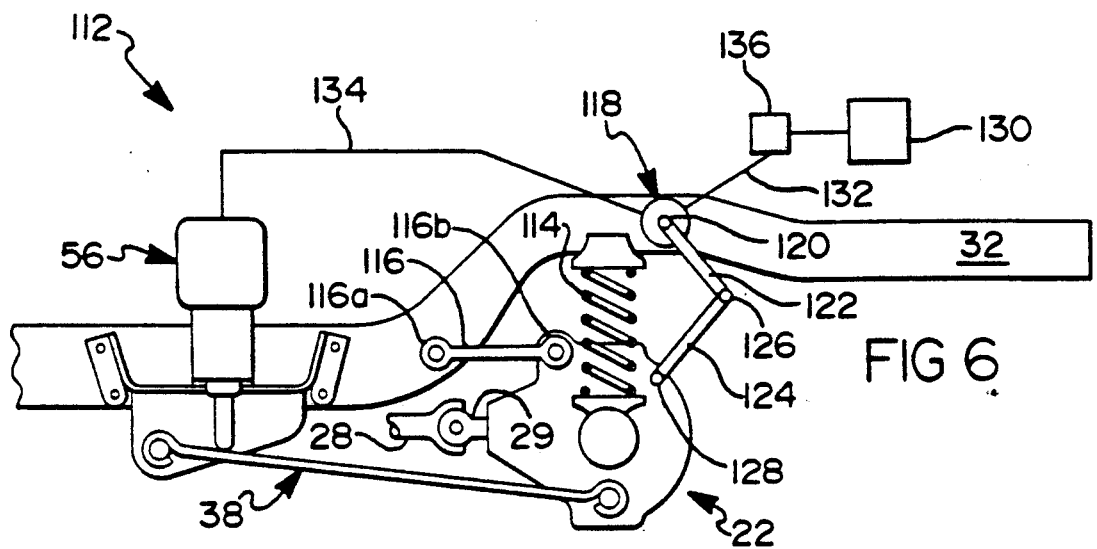

FIGS. 5 and 6 schematically illustrate alternative embodiments of main suspension springs in combination with the auxiliary leaf springs of the present invention. In these embodiments like components will be identified by like reference numbers.

In suspension embodiment 100 of FIG. 5 auxiliary leaf spring 38 is employed with an over slung main leaf spring 34 attached to the top of an axle assembly 102 which may be a rigid non-drive axle, as shown, or drive axle as in FIGS. 2 and 3. Actuator assembly 56 though different in outer appearance is basically the same as in FIGS. 2-4.

FIG. 6 schematically illustrates a suspension embodiment 112 wherein auxiliary leaf spring 38 and actuator assembly 56 are employed with a main suspension spring 114 of the coil type supporting the chassis on an axle assembly which may be of the drive or non-drive type. The embodiment of FIG. 6 includes a wishbone type link 116 pivotally attached at forward ends 116a to the chassis rails and at the rear end 116b to the axle assembly. Link 116 and auxiliary leaf spring 38 react against drive and braking torque and control the angular relation of drive and pinion shafts 28,29 in the same sense as the main and auxiliary leaf springs in FIGS. 2 and 3. Accordingly, the relative lengths of spring 38 and link 116 may be varied to provide different angular relations. Actuator assemblies 56, as well as the actuator assemblies in FIGS. 2, 5, 7, 8 and 10, may be controlled by a position means or rotary switch 118 having a housing affixed to the chassis and a rotatable shaft 120 connected to the axle assembly by links 122,124 pivotally connected together at 126, pivotally connected to the axle assembly at 128, and fixed to shaft 120. The angular position of shaft 120 represents the relative vertical relation of the chassis and axle assembly. Rotation of the shaft opens and closes switches to connect a source of electrical power 130 to the actuator assembly via wires 132,134. The actuator may be deactivated by a relay switch 136 which opens in response to certain conditions, e.g., when the vehicle is in motion.

Figure 7:
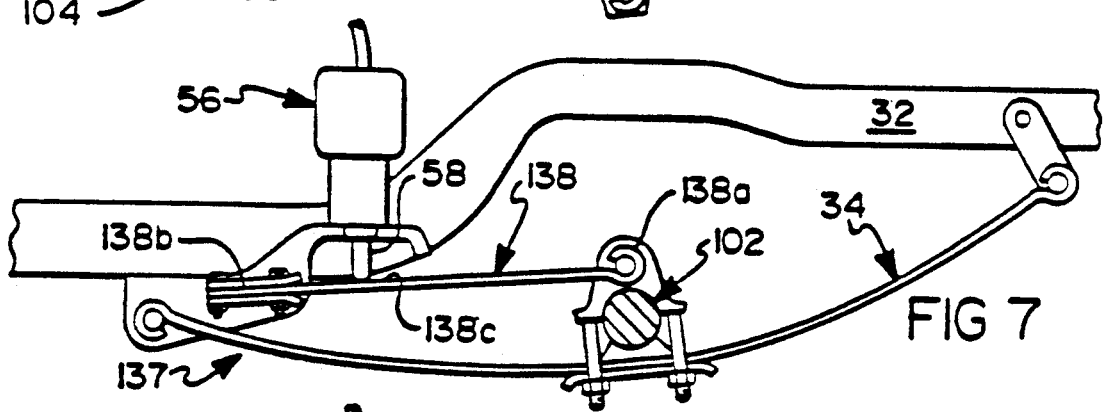
FIGS. 7 and 8 illustrate auxiliary leaf springs having one end affixed in cantilever fashion and the other end pivotally attached.
Figure 8:
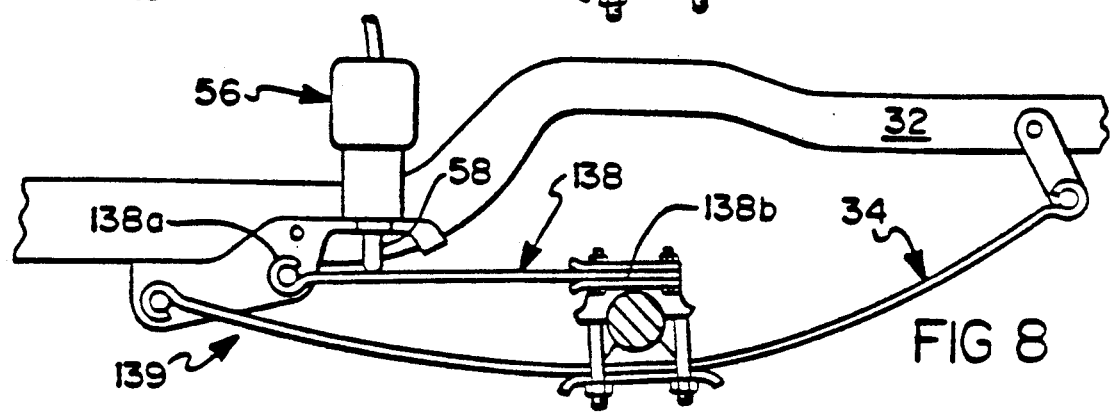

FIGS. 7 and 8 schematically illustrate alternative embodiments of the auxiliary leaf springs in combination with main suspension springs. The main suspension springs may be of the over or under slung leaf spring type 34 as respectively illustrated in FIG. 2 and 5, or they may be of the coil spring type illustrated in FIG. 6. In both embodiments of FIGS. 7 and 8, the auxiliary leaf springs are attached at both ends as in the previous description embodiments. In embodiment 137 of FIG. 7, the auxiliary leaf spring 138 has an end 138a pivotally attached to the axle assembly 102 as previously described and an end 138b which is rigidly affixed to chassis in cantilever fashion. Accordingly, auxiliary leaf spring 138 is continuously operative to vertically support the vehicle chassis in parallel with the main suspension spring. The combined spring rate of the main suspension springs and auxiliary spring 138 may be selected for ride comfort when the vehicle is unloaded or lightly loaded. When the vehicle load is increased, actuator 56 may move reaction member 58 into contact with a portion 138c of spring 138, thereby shortening the active flex length of spring 138 to increase its effective rate and the percentage of load supported thereby.

In embodiment 139 of FIG. 8, the auxiliary leaf spring 138 has end 138a pivotally attached to the chassis and end 138b rigidly affixed to the axle assembly in cantilever fashion. This reversed attachment arrangement of the ends for a given spring rate of the auxiliary springs causes the auxiliary springs to be somewhat less effective until actuator 56 moves reaction member 58 into contact with the auxiliary leaf spring portion 138c.

Figure 9:
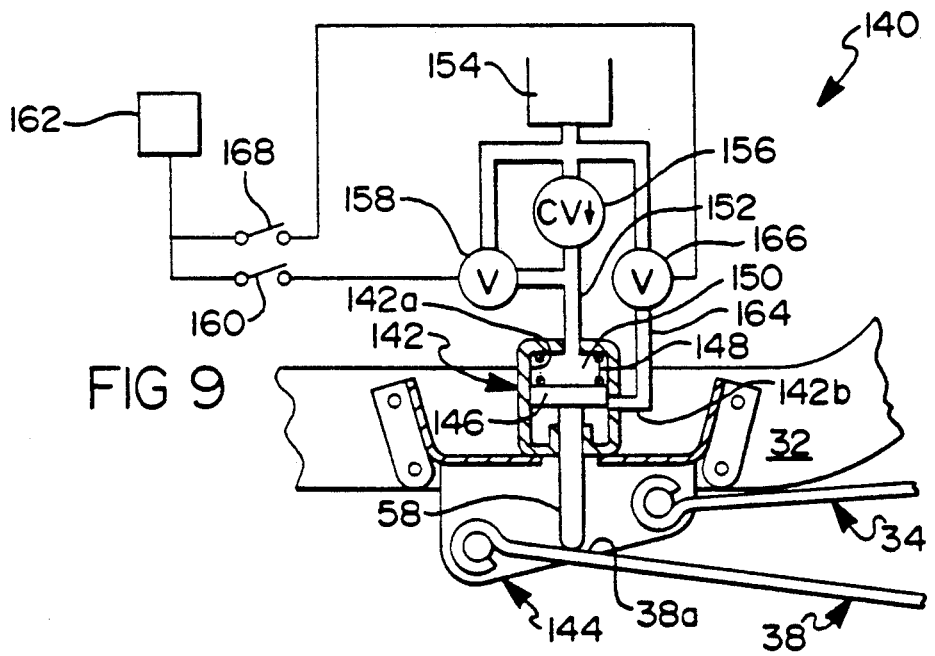
FIGS. 9 and 10 illustrate alternative control systems for engaging and disengaging the auxiliary leaf springs in each of the disclosed embodiments.
Figure 10:
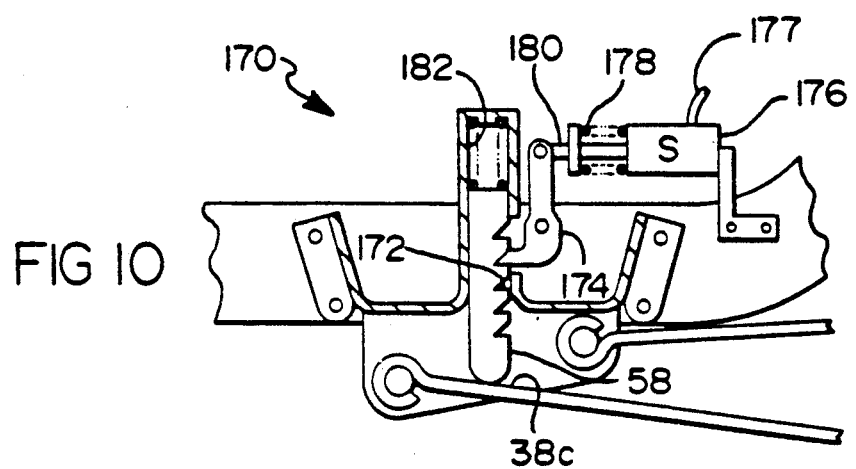

FIGS. 9 and 10 illustrate alternative actuator embodiments including controls operative in a first selectable position to minimize vertical load support by the auxiliary springs and operative in a second selectable position to progressively increase the vertical load support by the auxiliary springs in response to up-and-down movement of the auxiliary springs. In the first selectable position the reaction means is free to move up-and-down (to-and-fro) with corresponding movement of the auxiliary springs. In the second selectable position the reaction means is relatively free to move downward with the auxiliary springs but is inhibited or prevented against upward movement, thereby progressively increasing reactive engagement between the reaction means and the auxiliary springs for progressively increasing the amount of vertical support provided by the auxiliary springs.

The actuator assembly 140 of FIG. 9 includes a hydraulic cylinder 142 rigidly affixed to a bracket assembly 144 functionally equivalent to bracket assembly 46 in FIGS. 2 and 3, a piston 146 slidably disposed in a bore 142a defined by the cylinder, the reaction member 58 affixed to one end of the piston and biased downward into engagement with the auxiliary spring portion 38c by a spring 148 disposed in a variably volume chamber 150 defined by the piston and cylinder. A manifold conduit 152 communicates hydraulic fluid from a reservoir 154 to the chamber via a one-way valve 156. Flow of fluid from the chamber back to the reservoir is controlled by a valve 158 controlled by a manually operated switch 160 connected to a source of electrical power 162. Alternatively, valve 158 may be manually opened and closed or switch 160 may be replaced by the rotary and relay switches 118,136 of FIG. 6. As thus far described, piston 146 may move to its full downward position within the cylinder. An intermediate position or positions of the piston may be provided by a return passage 142b or passages which, when uncovered by the piston, allow chamber fluid to flow back to reservoir 154 via a conduit 164 and a valve 166 controlled by a manually operated switch 168. Manifold conduit 152 and conduit 164 may each be connected by branch conduits to the cylinder 142 associated with the other auxiliary leaf spring so as to provide control of hydraulic fluid thereto by the single set of valves and switches in FIG. 9.

FIG. 10 illustrates an actuator assembly 170 wherein the position of the reaction member 58 having ratchet teeth 172 is controlled by a pivotal pawl assembly 174 movable into and out of engagement with the ratchet teeth 172 in the reaction member. The pawl is engaged by a solenoid assembly 176 connectable to a source of electrical power via a conductor 177. A spring 178 extends the solenoid armature 180 to pivotally disengage the pawl when the solenoid of the solenoid assembly is de-energized. The reaction member is biased downward by a spring 182 with a force sufficient to overcome the force spring 178 acting on the ratchet teeth. To prevent a constant current drawn when the armature is engaged, the solenoid or pawl assemblies may include a latching mechanism. For example, the solenoid assembly may include a latching mechanism which holds the armature in the engaged position when the solenoid is initially energized to engage the pawl and which unlatches in response to momentary re-energization of the solenoid. Alternatively, the position of pawl 174 may be controlled by a manually operated push-pull arrangement such as a bowden wire, cables, or rods.

Several embodiments of the invention have been disclosed for illustration purposes. Many variations of the disclosed embodiments are believed to be within the spirit of the invention. The following claims are intended to cover inventive portions of the disclosed embodiments and modifications thereof which are believed to be within the spirit of the invention.

What is claimed is:

1. A vehicle comprising left and right ground engaging wheel mechanisms rotatably mounted on opposite ends of an axle assembly extending transverse to a longitudinal axis of a vehicle chassis assembly having front and rear ends; main spring means vertically supporting the chassis assembly on the axle assembly; first and second transversely spaced apart and generally longitudinally extending auxiliary leaf springs each having a first end attached to one of the assemblies and a second end disposed for reacting against the other assembly, the auxiliary leaf springs for vertically supporting the chassis on the axle assembly in parallel with the main spring means; and an actuator means affixed to one of the assemblies and selectively operative to position a reaction means between the one assembly and a portion intermediate the ends of each auxiliary leaf spring for varying the amount of vertical support provided by the auxiliary leaf springs; characterized by:

the actuator means including means for maintaining an end of each reaction means in contact with the auxiliary leaf spring portion and control means for controlling movement of the reaction means, the control means operative in a first selectable position to allow free to-and-fro movement of the reaction means with the auxiliary leaf spring portion and relative to the one assembly, and operative in a second selectable position to allow the free movement of the reaction means in one direction and to inhibit the free movement in the opposite direction for progressively increasing the vertical support provided by the auxiliary leaf springs.

2. The vehicle of claim 1, wherein the control means includes a plurality of ratchet teeth on each reaction means, a pawl, and means for engaging the pawl with the ratchet teeth to prevent movement of the reaction means in the one direction and means for disengaging the pawl from the ratchet teeth to allow the free to-and-fro movement of the reaction means.

3. The vehicle of claim 1, wherein the actuator means includes a piston having one end affixed to another end of the reaction means and movably disposed in a housing affixed to the one assembly, another end of the piston and the housing defining a fluid chamber, the control means including a passage means connecting the fluid chamber with a source of hydraulic fluid, and flow control means operative in the first position of the control means to allow to-and-fro flow of the hydraulic fluid between the fluid chamber and the source and operative in the second position of the control means to allow flow of the fluid from the source to the fluid chamber and to inhibit the fluid flow from the fluid chamber to the source.

4. The vehicle of claim 3, wherein the flow control means prevents the fluid flow from the fluid chamber to the source for allowing the fluid chamber to increase to a maximum volume.

5. The vehicle of claim 4, wherein the control means includes a third selectable position operative during operation in the second position to open a valve to connect the fluid chamber with the source prior to the fluid chamber increasing to the maximum volume.

6. The vehicle of claim 1, wherein the main spring means include first and second transversely spaced apart and generally longitudinally extending main leaf springs each having opposite ends in load supporting relation with the chassis and each having an intermediate portion affixed to the axle assembly.

7. The vehicle of claim 6, wherein both ends of each auxiliary leaf spring are pivotally attached.

8. The vehicle of claim 7, wherein the control means includes a plurality of ratchet teeth on each reaction means, a pawl, and means for engaging the pawl with the ratchet teeth to prevent movement of the reaction means in the one direction and means for disengaging the pawl from the ratchet teeth to allow the free to-and-fro movement of the reaction means.

9. The vehicle of claim 7, wherein the actuator means includes a piston having one end affixed to another end of the reaction means and movably disposed in a housing affixed to the chassis assembly, another end of the piston and the housing defining a fluid chamber, the control means including a passage means connecting the fluid chamber with a source of hydraulic fluid, and flow control means operative in the first position of the control means to allow to-and-fro flow of the hydraulic fluid between the fluid chamber and the source and operative in the second position of the control means to allow flow of the fluid from the source to the fluid chamber and to inhibit the fluid flow from the fluid chamber to the source.

10. The vehicle of claim 9, wherein the flow control means prevents the fluid flow from the fluid chamber to the source for allowing the fluid chamber to increase to a maximum volume.

11. The vehicle of claim 10, wherein the control means includes a third selectable position operative during operation in the second position to open a valve to connect the fluid chamber with the source prior to the fluid chamber increasing to the maximum volume.

12. The vehicle of claim 6, wherein the first end of each auxiliary leaf spring is pivotally attached to the chassis assembly and the second end is attached to the axle assembly in cantilever fashion.

13. The vehicle of claim 6, wherein the first end of each auxiliary leaf spring is attached in cantilever fashion to the chassis assembly and the second end is pivotally attached to the axle assembly.

14. The vehicle of claim 13, wherein the actuator means includes a piston having one end affixed to another end of the reaction means and movably disposed in a housing affixed to the one assembly, another end of the piston and the housing defining a fluid chamber, the control means including a passage means connecting the fluid chamber with a source of hydraulic fluid, and flow control means operative in the first position of the control means to allow to-and-fro flow of the hydraulic fluid between the fluid chamber and the source and operative in the second position of the control means to allow flow of the fluid from the source to the fluid chamber and to inhibit the fluid flow from the fluid chamber to the source.

15. The vehicle of claim 14, wherein the flow control means prevents the fluid flow from the fluid chamber to the source for allowing the fluid chamber to increase to a maximum volume.

16. The vehicle of claim 15, wherein the control means includes a third selectable position operative during operation in the second position to open a valve to connect the fluid chamber with the source prior to the fluid chamber increasing to the maximum volume.

* * * * *